(12) United States Patent
Tooyama et al.

(10) Patent No.: US 8,514,706 B2
(45) Date of Patent: Aug. 20, 2013

(54) RADIO COMMUNICATION SYSTEM, RADIO NETWORK CONTROLLER, RADIO BASE STATION AND RADIO COMMUNICATION METHOD

(75) Inventors: Hiroto Tooyama, Yokosuka (JP); Yoshifumi Morihiro, Shinagawa-ku (JP); Kouji Makino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 329 days.

(21) Appl. No.: 13/080,237

(22) Filed: Apr. 5, 2011

(65) Prior Publication Data

US 2011/0242977 A1    Oct. 6, 2011

(30) Foreign Application Priority Data

Apr. 5, 2010   (JP) .................. 2010-087144

(51) Int. Cl.
*H04W 28/12*   (2009.01)
*H04W 72/00*   (2009.01)
*H04L 12/56*   (2006.01)

(52) U.S. Cl.
USPC ... 370/231; 370/236.1; 370/335; 370/395.21; 370/468; 455/450

(58) Field of Classification Search
USPC .............. 370/231–468; 455/442, 450, 452.1, 455/452.2, 453, 562.1; 725/94, 96
See application file for complete search history.

(56) References Cited

U.S. PATENT DOCUMENTS

| | | | | |
|---|---|---|---|---|
| 5,598,416 A * | 1/1997 | Yamada et al. | ............... | 370/468 |
| 5,841,773 A * | 11/1998 | Jones | ......................... | 370/236.1 |
| 8,238,928 B2 * | 8/2012 | Fodor | ........................ | 455/452.1 |
| 8,289,899 B2 * | 10/2012 | Ehara et al. | .................... | 370/328 |
| 2007/0064722 A1 * | 3/2007 | Fang | ............................. | 370/452 |
| 2009/0201856 A1 * | 8/2009 | Hayashi et al. | ............... | 370/328 |
| 2009/0207772 A1 | 8/2009 | Ehara et al. | | |

FOREIGN PATENT DOCUMENTS

EP    2 088 816 A2    8/2009

OTHER PUBLICATIONS

"3GPP TS 25.308" $3^{rd}$ Generation Partnership Project, vol. 9.1.0, Sep. 2009, pp. 1-65.
"3GPP TS 25.309" $3^{rd}$ Generation Partnership Project, vol. 6.6.0, Mar. 2006, pp. 1-34.
Extended European Search Report Issued Jun. 18, 2012 in Patent Application No. 11161119.0.

* cited by examiner

*Primary Examiner* — Afsar M Qureshi
(74) *Attorney, Agent, or Firm* — Oblon, Spivak, McClelland, Maier & Neustadt, L.L.P.

(57)   ABSTRACT

A radio network controller activates a signal transmission suppression timer to suppress transmission of a congestion signal, when a new radio base station is added as a radio base station with which the radio terminal is to communicate, and suspends the transmission of the congestion signal to the radio base stations until the signal transmission suppression timer expires.

11 Claims, 8 Drawing Sheets

RADIO COMMUNICATION SYSTEM, RADIO NETWORK CONTROLLER, RADIO BASE STATION AND RADIO COMMUNICATION METHOD

CROSS REFERENCE TO RELATED APPLICATIONS

This application is based upon and claims the benefit of priority from prior Japanese Patent Application No. 2010-087144, filed on Apr. 5, 2010; the entire contents of which are incorporated herein by reference.

BACKGROUND OF THE INVENTION

1. Field of the Invention

The present invention relates to a radio communication system including a radio base station and a radio network controller, a radio base station, a radio network controller and a radio communication method used in a radio communication system.

2. Description of the Related Art

Conventionally, a radio communication system including a radio base station and a radio network controller is known. The radio base station includes a single or multiple cells, each of which performs radio communication with a radio terminal. The radio network controller manages multiple radio base stations and allocates a radio resource to radio terminals. Such technology may be referred to as R99 (Release 99).

In recent years, a technology for allocating a radio resource or the like by a radio base station has been proposed for the purposes of improving the throughput, reducing the delay time, and the like. Such technology may be referred to as High Speed Downlink Packet Access (HSDPA), High Speed Uplink Packet Access (HSUPA), Enhanced Uplink (EUL), and the like (for example, 3GPP TS25. 308 V9.1.0, 3GPP TS25.309 V6.6.0).

Here, in an uplink communication, the radio base station assigns a station-specific sequence number (FSN: Frame Sequence Number) to the uplink user data received from a radio terminal. The radio network controller determines a congestion state of a link of the physical layer (TNL; Transport Network Layer) between the radio base station and the radio network controller by checking continuity of the sequence numbers assigned to the uplink data.

In addition, there are known technologies for a radio terminal to hand over from a first radio base station to a second radio base station according to movement of the radio terminal. For example, one conceivable method (hereinafter, referred to as the first method) is that the radio network controller receives the uplink user data from the radio terminal via either the first radio base station or the second radio base station in the handover state by releasing a link between the radio network controller and the first radio base station and then establishing a link between the radio network controller and the second radio base station. Alternatively, another conceivable method (hereinafter, referred to as the second method) is that the radio network controller receives the uplink user data from the radio terminal via both the first radio base station and the second radio base station in the handover state by establishing a link between the radio network controller and the second radio base station while maintaining a link between the radio network controller and the first radio base station.

In the first method, sequence numbers specific to the first radio base station and sequence numbers specific to the second radio base station are not mixed. However, the link between the radio network controller and the first radio base station is released first and then the link between the radio network controller and the second radio base station is established, whereby instantaneous disconnection occurs. In other words, the first method leads to deterioration (reduction) the transmission rate of the uplink user data.

On the other hand, in the second method, the link between the radio network controller and the second radio base station is established while maintaining the link between the radio network controller and the first radio base station, whereby no instantaneous disconnection occurs. Therefore, compared with the first method, the second method can suppress drop in the transmission rate of the uplink user data. However, station-specific sequence numbers assigned by the first radio base station are not associated with station-specific sequence numbers assigned by the second radio base station, and the radio network controller thus receives data assigned discontinuous sequence numbers. As a result, the radio network controller may possibly make erroneous judgment that a link (TNL link) between a radio base station and the radio network controller is congested. Due to such erroneous judgment, the radio network controller transmits a congestion signal (for example, TNL Congestion Indicator) to a radio base station, and the radio base station transmits the transmission rate reduction signal to the radio terminal. In other words, the second method also leads to deterioration (reduction) the transmission rate of the uplink user data.

SUMMARY OF THE INVENTION

A radio communication system according to a first aspect, comprise a radio base station and a radio network controller. The radio base station assigns station-specific sequence numbers to uplink user data received from a radio terminal. The radio network controller transmits the radio base station a congestion signal indicating that a link between the radio base station and the radio network controller is congested, in response to detection of a sequence error of the sequence numbers. The radio base station transmits the radio terminal a transmission rate reduction signal instructing to reduce the transmission rate of the uplink user data in response to the congestion signal. The radio network controller activates a signal transmission suppression timer to suppress transmission of the congestion signal, when a second radio base station is added as a radio base station with which the radio terminal is to communicate in addition to a first radio base station, and suspends the transmission of the congestion signal to the first radio base station and the second radio base station until the signal transmission suppression timer expires.

A radio communication system according to a second aspect comprises a radio base station and a radio network controller. The radio base station assigns station-specific sequence numbers to uplink user data received from a radio terminal. The radio network controller transmits the radio base station a congestion signal indicating that a link between the radio base station and the radio network controller is congested, in response to detection of a sequence error of the sequence numbers. The radio base station transmits the radio terminal a transmission rate reduction signal instructing to reduce the transmission rate of the uplink user data in response to the congestion signal. The radio base stations activate a signal transmission suppression timer to suppress transmission of the transmission rate reduction signal, when a second radio base station is added as a radio base station with which the radio terminal is to communicate in addition to a first radio base station, and suspend the transmission of the transmission rate reduction signal to the radio terminal until the signal transmission suppression timer expires even when the congestion signal is received from the radio network controller.

A radio communication system according to a third aspect comprises a radio base station and a radio network controller. The radio base station assigns station-specific sequence numbers to uplink user data received from a radio terminal. The radio network controller transmits the radio base station a congestion signal indicating that a link between the radio base station and the radio network controller is congested, in response to detection of a sequence error of the sequence numbers. The radio base station transmits the radio terminal a transmission rate reduction signal instructing to reduce the transmission rate of the uplink user data in response to the congestion signal. The radio network controller eases a signal transmission condition for transmitting the congestion signal such that the congestion signal is less likely to be transmitted in response to the detection of the sequence error of the sequence numbers, when a second radio base station is added as a radio base station with which the radio terminal is to communicate in addition to a first radio base station.

In the third aspect, the radio network controller detects the sequence error of the sequence numbers for a predetermined detection period. The ease of the signal transmission condition is to shorten the predetermined detection period.

In the third aspect, the radio network controller transmits the congestion signal when a predetermined number of sequence errors of the sequence numbers occur. The ease of the signal transmission condition is to increase the predetermined number.

A radio network controller according to a fourth aspect is used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal. The radio network controller comprises: a timer management unit configured to activate a signal transmission suppression timer to suppress transmission of the congestion signal when a second radio base station is added as a radio base station with which the radio terminal is to communicate in addition to a first radio base station; and a transmitter configured to suspend the transmission of the congestion signal to the first radio base station and the second radio base station until the signal transmission suppression timer expires.

A radio base station according to a fifth aspect is used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal. The radio base station comprises: a timer management unit configured to activate a signal transmission suppression timer to suppress transmission of the transmission rate reduction signal when a second radio base station is added as a radio base station with which the radio terminal is to communicate in addition to a first radio base station; and a transmitter configured to suspend the transmission of the transmission rate reduction signal to the radio terminal until the signal transmission suppression timer expires even when the congestion signal is received from the radio network controller.

A radio network controller according to a sixth aspect is used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal. The radio network controller comprises: a condition managing unit configured to ease a signal transmission condition for transmitting the congestion signal in response to the detection of the sequence error of the sequence numbers when a second radio base station is added as a radio base station with which the radio terminal is to communicate in addition to a first radio base station.

A radio communication method according to a seventh aspect is used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal. The method comprises the steps of: activating, by the radio network controller, a signal transmission suppression timer to suppress transmission of the congestion signal when a second radio base station is added as a radio base station with which the radio terminal is to communicate in addition to a first radio base station; and suspending, by the radio network controller, transmission of the congestion signal to the first radio base station and the second radio base station until the signal transmission suppression timer expires.

A radio communication method according to an eighth aspect is used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal. The method comprises the steps of: activating, by the radio base stations, a signal transmission suppression timer to suppress transmission of the transmission rate reduction signal when a second radio base station is added as a radio base station with which the radio terminal is to communicate in addition to a first radio base station; and suspending, by the radio base station, transmission of the transmission rate reduction signal to the radio terminal until the signal transmission suppression timer expires even when the congestion signal is received from the radio network controller.

A radio communication method according to ninth aspect is used in a radio communication system including a radio base station and a radio network controller, the radio base station assigning station specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal. The method comprises the step of: easing, by the radio network controller, a signal transmission condition for transmitting the congestion signal in response to detection of the sequence error of the sequence numbers when a second radio base station is added as a radio base station with which the radio terminal is to communicate in addition to a first radio base station.

DETAILED DESCRIPTION OF THE EMBODIMENTS

A radio communication system according to the embodiment of the present invention will be described below with reference to the drawings. In the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

Outline of Embodiment

A radio communication system according to the embodiment includes radio base station and a radio network controller. In the radio communication system, the radio base station assigns a station-specific sequence number to the uplink user data received from a radio terminal. In response to detection of a sequence error of the sequence numbers, the radio network controller transmits the radio base station a congestion signal indicating that a link between the radio base station and the radio network controller is congested. In response to the congestion signal, the radio base station transmits the radio terminal the transmission rate reduction signal instructing to reduce the transmission rate of the uplink user data.

Firstly, when a second radio base station is added as radio base stations with which the radio terminal is to communicate in addition to a first radio base station, the radio network controller activates a signal transmission suppression timer to suppress transmission of the congestion signal. The radio network controller suspends the transmission of the congestion signal to the first and second radio base stations until the signal transmission suppression timer expires.

According to such radio network controller, when the second radio base station is added as a radio base station with which the radio terminal is to communicate in addition to the first radio base station, the transmission of the congestion signal is suppressed until the signal transmission suppression timer expires. In other words, a sequence error of the sequence numbers caused due to the addition of the second radio base station to the first radio base station is neglected until the signal transmission suppression timer expires. Thus, drop in the transmission rate of the uplink user data is suppressed.

Secondly, when a second radio base station is added to a first radio base station as a radio base station with which the radio terminal communicates, the radio base stations activates a signal transmission suppression timer to suppress transmission of the transmission rate reduction signal. Even when the congestion signal is received from the radio network controller, the radio base station suspends the transmission of the transmission rate reduction signal to the radio terminal until the signal transmission suppression timer expires.

According to such radio base station, when the second radio base station is added to the first radio base station as a radio base station with which the radio terminal communicates, the transmission of the transmission rate reduction signal to the radio terminal is suppressed until the signal transmission suppression timer expires, even if the radio base station receives the congestion signal from the radio network controller. In other words, the received congestion signal which has been transmitted due to the addition of the second radio base station to the first radio base station is neglected until the signal transmission suppression timer expires. Thus, drop in the transmission rate of the uplink user data is suppressed.

Note that, the radio base station may be either one of the first radio base station or the second radio base station, or both the first and second radio base stations.

Thirdly, when the second radio base station is added to the first radio base station as a radio base station with which the radio terminal communicates, the radio network controller eases signal transmission condition for transmitting the congestion signal such that the congestion signal is less likely to be transmitted in response to the detection of the sequence error of the sequence numbers.

According to such a radio network controller, when the second radio base station is added to the first radio base station as a radio base station with which the radio terminal communicates, a sequence error of the sequence numbers caused due to the addition of the second radio base station to the first radio base station is less likely to be detected. Thus, transmission of the congestion signal is suppressed, and drop in the transmission rate of the uplink user data is suppressed.

First Embodiment

Configuration of Radio Communication System

Figure 1:
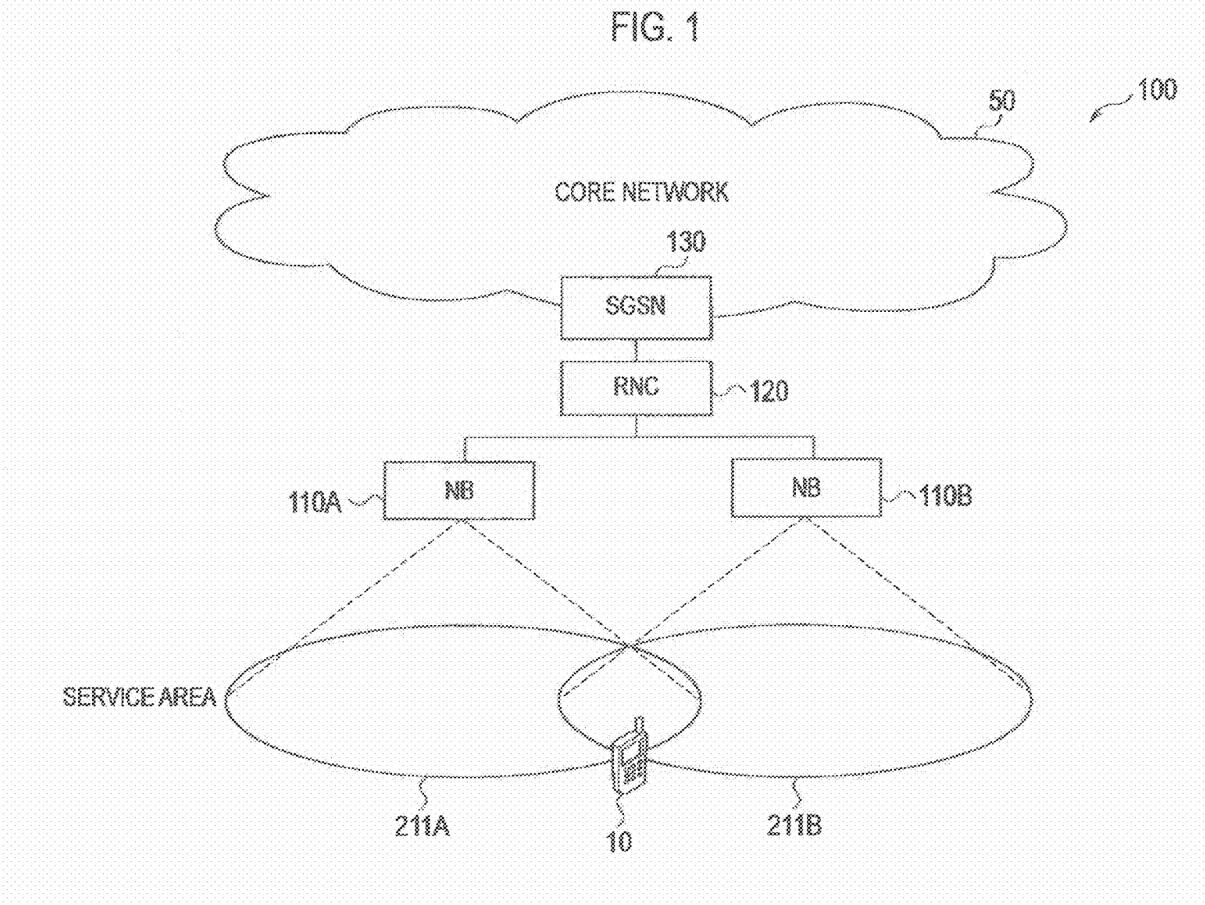
FIG. 1 is a diagram showing a radio communication system 100 according to the first embodiment.

Hereinafter, a radio communication system according to the first embodiment is described with reference to the accompanying drawings. FIG. 1 is a diagram showing a radio communication system 100 according to the first embodiment.

As shown in FIG. 1, the radio communication system 100 includes a radio terminal 10 (hereinafter, referred to as UE 10), a radio base station 110 (hereinafter, referred to as NB 110), a radio network controller 120 (hereinafter, referred to as RNC 120), and an SGSN 130. Further, the radio communication system 100 includes a core network 50.

The UE 10 is a device (User Equipment) configured to communicate with the radio communication system 100. For example, the UE 10 is provided with a function to perform radio communication with the NB 110 and the RNC 120.

The NB 110 is a device (Node B) which has a cell 211 and which performs radio communication with the UE 10 existing in the cell 211. According to the first embodiment, a radio base station 110A having a cell 211A (hereinafter, referred to as NB 110A) and a radio base station 110B having a cell 211B (hereinafter, referred to as NB110B) are provided as the NB 110.

The RNC 120 is a device (Radio Network Controller) which is connected to the NB 110 and which establishes a radio connection (RRC connection) with the UE 10 existing in the cell 211.

The SGSN 130 is a device (Serving GPRS Support Node) which performs packet switching in the packet switching domain. The SGSN 130 is provided in the core network 50. Although being omitted in FIG. 1, a device (MSC; Mobile Switching Center) which performs circuit switching in the circuit switching domain may be provided in the core network 50.

In the first embodiment, the cell should be considered as a function to perform radio communication with the UE 10. However, the cell is also used as a term indicating the service area of the cell. Further, the cell is distinguished in frequency, spreading code, time slot or the like used therein.

Further, in the first embodiment, a framework in which the NB 110 performs allocation of an uplink radio resource and the like is applied. A framework in which the NB 110 performs allocation of the uplink radio resource and the like may be referred to as High Speed Uplink Packet Access (HSUPA), Enhanced Uplink (EUL), or the like.

Configuration of Protocol Stack

Figure 2:
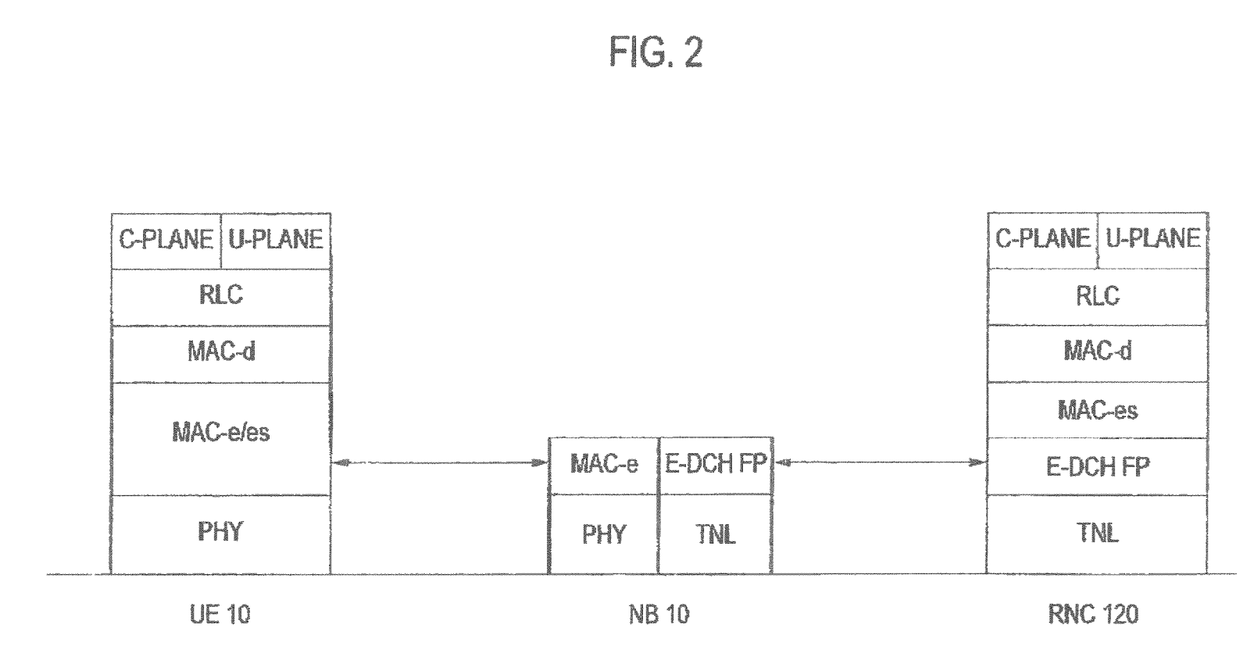
FIG. 2 is a diagram showing a protocol stack according to the first embodiment.

Hereinafter, a protocol stack according to the first embodiment is described with reference to the accompanying drawings. FIG. 2 is a diagram showing a protocol stack according to the first embodiment.

As shown in FIG. 2, the UE 10 includes PHY, MAC-e/es, MAC-d, RLC, C-PLANE, and U-PLANE. The NB 110 includes PHY, MAC-e, TNL, and E-DCH FP. The RNC 120 includes TNL, E-DCH FP, MAC-es, MAC-d, RLC, C-PLANE, and U-PLANE.

The PHY is a layer which is provided in each of the UE 10 and the NB 110 and which performs processing for a physical channel between the UE 10 and the NB 110. The physical channel is, for example, Dedicated Physical Data Channel (DPDCH), Dedicated Physical Control Channel (DPCCH), Enhanced DPDCH (E-DPDCH), Enhanced DPCCH (E-DPCCH), Enhanced Absolute Grant Channel (E-AGCH), Enhanced Relative Grant Channel (E-RGCH).

Note that, the E-AGCH and E-RGCH are channels to carry the transmission rate control signal to control the transmission rate of the uplink user data transmitted from the UE 10 to the NB 110 via the E-DPDCH.

For example, a transmission rate control signal carried by E-AGCH is called absolute grant (AG). AG is a signal (index) directly specifying the transmission power ratio (E-DPDCH/DPCCH) allocated to the UE 10 (see 3GPP TS25.212 Ver. 7.5.04.10.1A.1 "Information field mapping of the Absolute Grant Value").

A transmission rate control signal carried by the E-RGCH is called relative grant (RG). The RG is a signal ("Up", "Down", and "Hold") relatively specifying the transmission power ratio (E-DPDCH/DPCCH) allocated to the UE 10 (see 3GPP TS25.321 Ver. 7.5.09.2.5.2.1 "Relative Grants").

Such transmission rate control signal can be used as a transmission rate reduction signal which instructs to reduce the transmission rate of the uplink user data transmitted from the UE 10 to the NB 110 via the E-DPDCH.

The MAC-e/es includes the MAC-e and MAC-es, The MAC-e is a layer which is provided in each of the UE 10 and the NB 110 and which controls Hybrid Automatic Repeat Request (HARQ) and allocation of the transmission rate. The MAC-e reconfigures a PDU corresponding to the MAC-d (hereinafter, referred to as MAC-d PDU) to a PDU corresponding to the MAC-e (hereinafter, referred to as MAC-e PDU). Alternatively, the MAC-e may reconfigure the MAC-e PDU to the MAC-d PDU.

The MAC-es is a layer which is provided in each of the UE 10 and the RNC 120 and which functions as an interface between the MAC-e and the MAC-d. For example, the MAC-es performs processing such as rearrangement of PDUs corresponding to the MAC-es (hereinafter, referred to as MAC-es PDUs) and removal of duplicated MAC-e PDUs on the basis of a sequence number (TSN; Transmission Sequence Number) assigned by the UE 10. Note that, the sequence number (TSN) is assigned to each MAC-es PDU.

The MAC-d is a layer which is provided in each of the UE 10 and the RNC 120 and which functions as an interface between MAC-es and RLC. The MAC-d reconfigures data constituting DCCH (Dedicated Control Channel) from C-PLANE and DTCH (Dedicated Traffic Channel) from U-PLANE, to the MAC-d PDU. Alternatively, the MAC-d may reconfigure the MAC-d PDU to data constituting DCCH and DTCH.

The RLC is a layer which is provided in each of the UE 10 and the RNC 120 and which functions as an interface between the MAC-d and the C-PLANE and between the MAC-d and the U-PLANE. For example, the RLC performs retransmission control (hereinafter, referred to as RLC retransmission control) between the UE 10 and the RNC 120.

The C-PLANE is a layer which processes control data. The U-PLANE is a layer which processes user data.

The TNL is a layer (Transport Network Layer) which is provided in each of the NB 110 and the RNC 120 and which processes physical data between the NB 110 and the RNC 120.

The E-DCH FP is a layer which is provided in each of the NB 110 and the RNC 120 and which performs flow control between the NB 110 and the RNC 120.

For example, the E-DCH FP of the NB 110 assigns a sequence number (FNS; Frame Sequence Number) specific to the NB 110 to a PDU transmitted between the NB 110 and the RNC 120.

Furthermore, when the physical layer (TNL) between the NB 110 and the RNC 120 is congested, the E-DCH FP of the RNC 120 transmits the E-DCH FP of the NB 110 a congestion signal (TNL Congestion Indicator) indicating that a link between the NB 110 and the RNC 120 is congested. Note that, the E-DCH FP of the RNC 120 detects congestion in the physical layer (TNL) between the NB 110 and the RNC 120 on the basis of a sequence error of the sequence numbers (FNS) (TNL Congestion Detection).

Configuration of Radio Base Station

Figure 3:
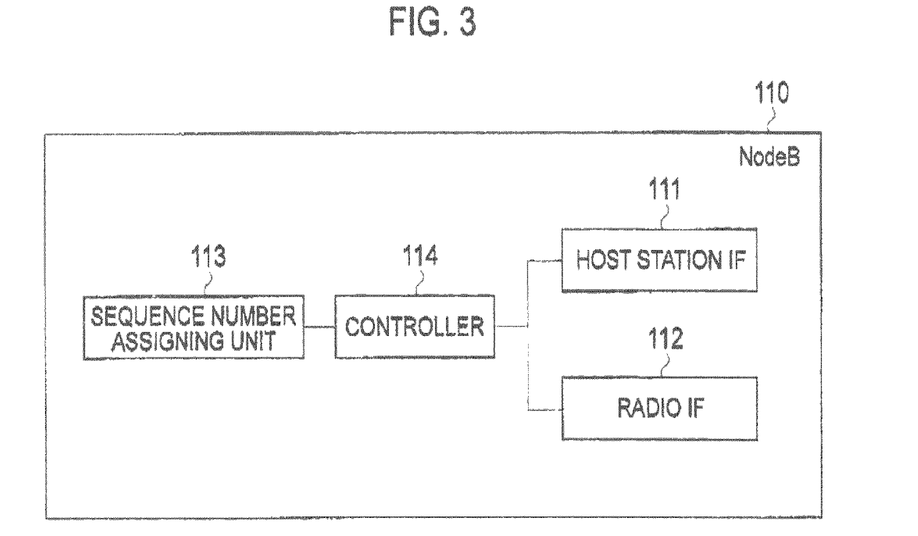
FIG. 3 is a block diagram showing an NB 110 according to the first embodiment.

Hereinafter, the radio base station according to the first embodiment is described with reference to the accompanying drawings. FIG. 3 is a block diagram showing the NB110 according to the first embodiment. Note that, since the configuration of the NB 110 is described mainly, components shown in FIG. 3 are different from protocol stacks shown in FIG. 2. Note that, the components shown in FIG. 3 cooperate with each other to achieve functions of the protocol stack shown in FIG. 2.

As shown in FIG. 3, the NB 110 includes a host station IF 111, a radio IF 112, a sequence number assigning unit 113, and a controller 114.

The host station IF 111 is an interface to communicate with a host station (for example, RNC 120) of the NB 110. The host station IF 111, for example, transmits the RNC 120 a PDU corresponding to the E-DCH FP via the TNL. Alternatively, the host station IF 111, for example, may receive the congestion signal (TNL Congestion Indicator) indicating congestion of the TNL from the RNC 120 via the TNL.

The radio IF 112 is an interface to communicate with the UE 10. The radio IF 112, for example, receives a PDU corresponding to MAC-e from the UE 10 via the PHY(E-DP-DCH) Alternatively, the radio IF 112, for example, may transmit the UE 10 the transmission rate control signal to via the PHY(E-AGCH or E-RGCH). Note that, the transmission rate control signal can be used as the transmission rate reduction signal as described above.

The sequence number assigning unit 113 assigns a sequence number (FNS) specific to the NB 110 to a PDU corresponding to the E-DCH FP. Note that, since the sequence number (FNS) is specific to each NB 110, continuous sequence numbers are not assigned between a plurality of NBs 110 when switching from one to another.

The controller 114 controls the NB 110. For example, when the NB 110 receives the congestion signal (TNL Congestion Indicator) indicating that TNL is congested, the controller 114 instructs the radio IF 112 to transmit the transmission rate reduction signal instructing to reduce the transmission rate of the uplink user data via the E-AGCH or E-RGCH.

Configuration of Radio Network Controller

Figure 4:
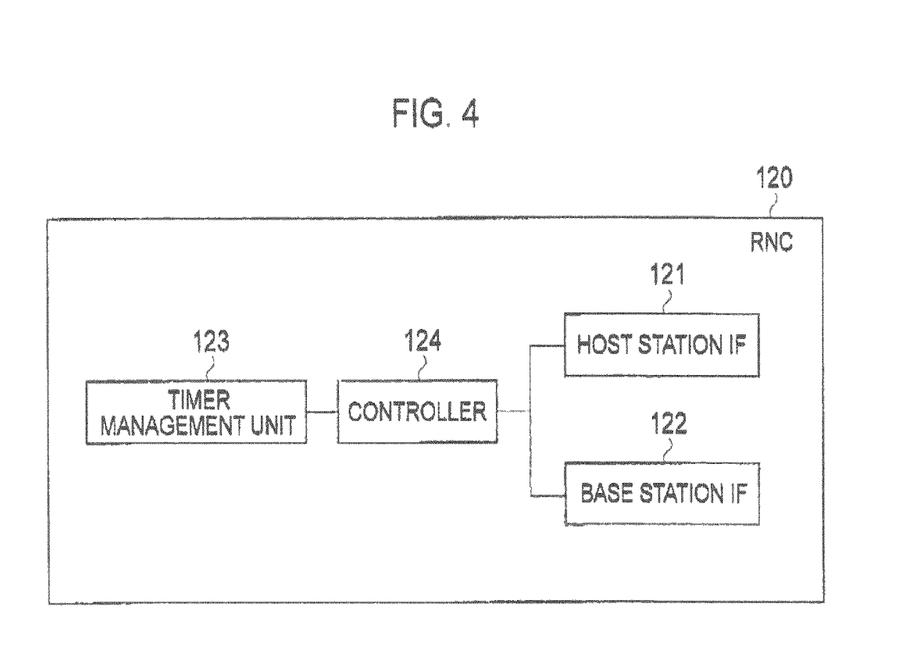
FIG. 4 is a block diagram showing an RNC 120 according to the first embodiment.

Hereinafter, the radio network controller according to the first embodiment is described with reference to the accompanying drawings. FIG. 4 is a block diagram showing the RNC 120 according to the first embodiment. Note that, since the configuration of the RNC 120 is described mainly, components shown in FIG. 4 are different from protocol stacks shown in FIG. 2. Note that, the components shown in FIG. 4 cooperate with each other to achieve functions of the protocol stack shown in FIG. 2.

As shown in FIG. 4, the RNC 120 includes a host station IF 121, a base station IF 122, a timer management unit 123, and a controller 124.

The host station IF 121 is an interface to communicate with a host station (for example, SGSN 130) of the RNC 120.

The base station IF 122 is an interface to communicate with the NB 110. The base station IF 122, for example, receives a PDU corresponding to the E-DCH FP from the NB 110 via the TNL. Alternatively, the base station IF 122, for example, may transmit the NB 110 the congestion signal (TNL Congestion Indicator) indicating congestion of the TNL via the TNL.

The timer management unit 123 manages various timers. For example, the timer management unit 123 manages a sequence number monitoring timer to detect a sequence error of the sequence numbers (FSNs). Furthermore, the timer management unit 123 manages a signal transmission suppression timer to suppress transmission of the congestion signal.

The controller 124 controls the RNC 120. For example, the controller 124 instructs the base station IF 122 to transmit the congestion signal (TNL Congestion Indicator) indicating that the TNL is congested, when a sequence error of the sequence numbers (FSNs) is detected within a period from the time when the sequence number monitoring timer is activated until the time when the sequence number monitoring timer expires. As an alternative, the controller 124 may instruct the base station IF 122 to transmit the congestion signal (TNL Congestion Indicator) indicating that the TNL is congested, when a predetermined number of sequence errors of the sequence numbers (FSNs) occur. As another alternative, the controller 124 may instruct the base station IF 122 to transmit the congestion signal (TNL Congestion Indicator) indicating that the TNL is congested, when a predetermined number of sequence errors of the sequence numbers (FSNs) occur within the period from the time when the sequence number monitoring timer is activated until the time when the sequence number monitoring timer expires.

Here, the controller 124 activates the signal transmission suppression timer when a new NB 110 is added as an NB 110 with which the UE 10 is to communicate. The controller 124 suspends the transmission of the congestion signal within the period from the time when the signal transmission suppression timer is activated until the time when the signal transmission suppression timer expires. In other words, the controller 124 suspends the transmission of the congestion signal until the signal transmission suppression timer expires even if the signal transmission condition for transmitting the congestion signal is satisfied.

Example of Congestion Signal Transmission Suppression

Figure 5:
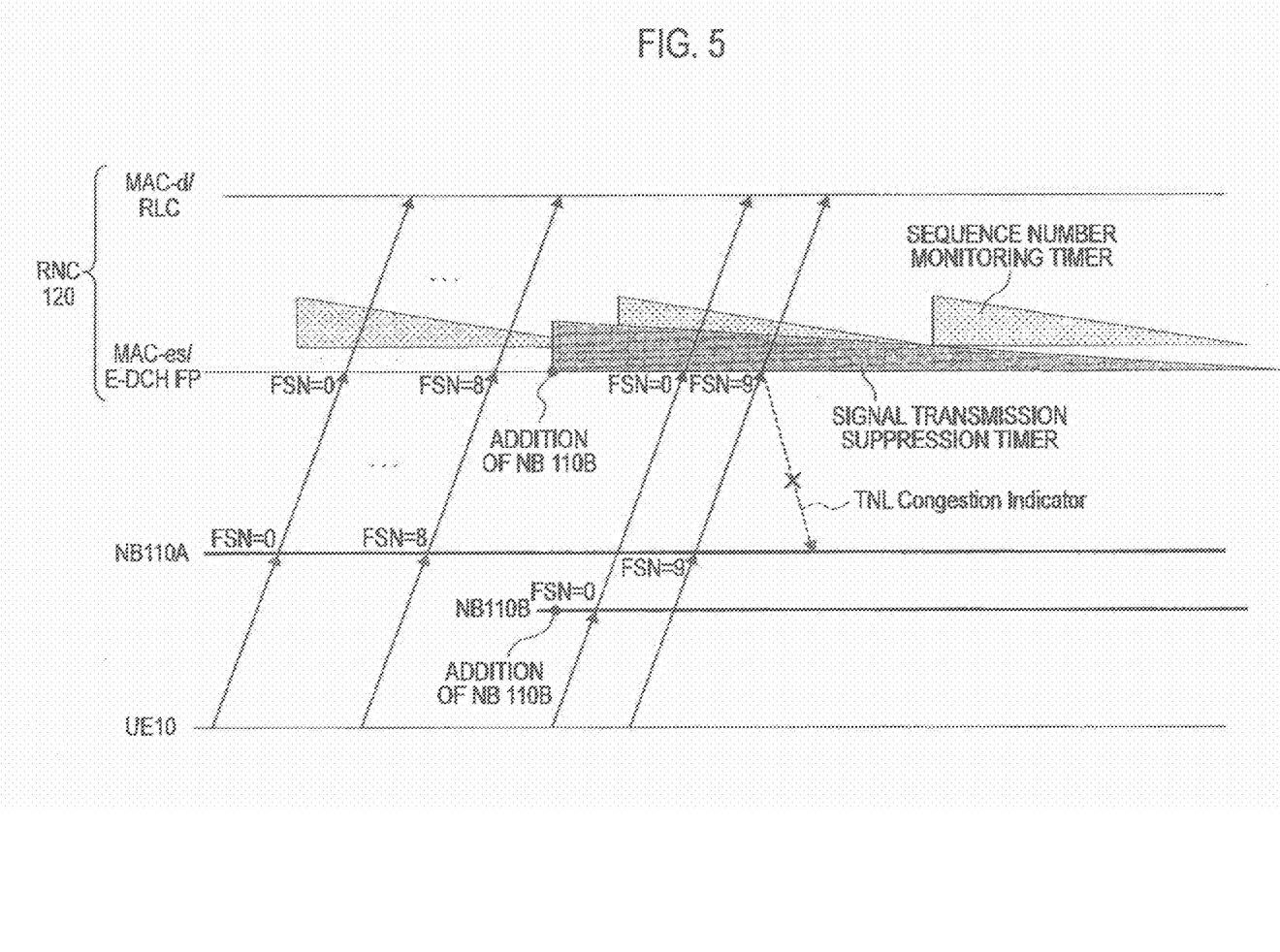
FIG. 5 is a diagram showing an example of congestion signal transmission suppression according to the first embodiment.

Hereinafter, an example of congestion signal transmission suppression according to the first embodiment is described with reference to the accompanying drawings. FIG. 5 is a diagram showing the example of the congestion signal transmission suppression according to the first embodiment. Here, a case where the NB 110B is added as an NB 110 with which the UE 10 is to communicate in addition to the NB 110A is illustrated.

As shown in FIG. 5, the NB 110A reconfigures data received from the UE 10, and assigns a sequence number (FSN) specific to the NB 110A to a PDU corresponding to the E-DCH FP. The NB110A transmits the RNC 120 the PDU to which the FSN is assigned.

The E-DCH FP of the RNC 120 receives the PDU to which the FSN is assigned. The E-DCH FP of the RNC 120 monitors whether or not a sequence error of the FSNs occurs within the period from the time when the sequence number monitoring timer is activated until the time when the sequence number monitoring timer expires.

When the NB 110B is added as an NB 110 with which the UE 10 is to communicate in addition to the NB 110A at this time, the E-DCH FP of the RNC 120 activates the signal transmission suppression timer.

The E-DCH FP of the RNC 120 detects the discontinuity between the FSN ("9" in this case) of the PDU received from the NB 110A and the FSN ("0" in this case) of the PDU received from the NB 110B, The E-DCH FP of the RNC 120, which normally transmits the congestion signal (TNL Congestion Indicator), suspends the transmission of the congestion signal since the signal transmission suppression timer has not expired yet.

Operation and Effect

In the first embodiment, in a case where a new NB 110 is added as an NB 110 with which the UE 10 is to communicate, the transmission of the congestion signal is suppressed until the signal transmission suppression timer expires when the new NB 110B is added. In other words, the sequence error of the sequence numbers caused due to the addition of the new radio base station is neglected until the signal transmission suppression timer expires. Thus, drop in the transmission rate of the uplink user data is suppressed.

Note that, a data piece received from the previously communicating NB 110 and a data piece received from the new NB 110 are combined together by the MAC-e/es or the RLC of the RNC 120. Thus, even if the E-DCH FP of the RNC 120 fails to work temporarily, no problem occurs as a whole.

Modification 1

Hereinafter, Modification 1 of the first embodiment is described with reference to the accompanying drawings. Differences from the first embodiment are mainly described below.

Specifically, according to the first embodiment, the RNC 120 suspends the transmission of the congestion signal by use of the signal transmission suppression timer. Instead, according to Modification 1, an NB 110 suspends the transmission of the transmission rate reduction signal by use of the signal transmission suppression timer.

Configuration of Radio Base Station

Figure 6:
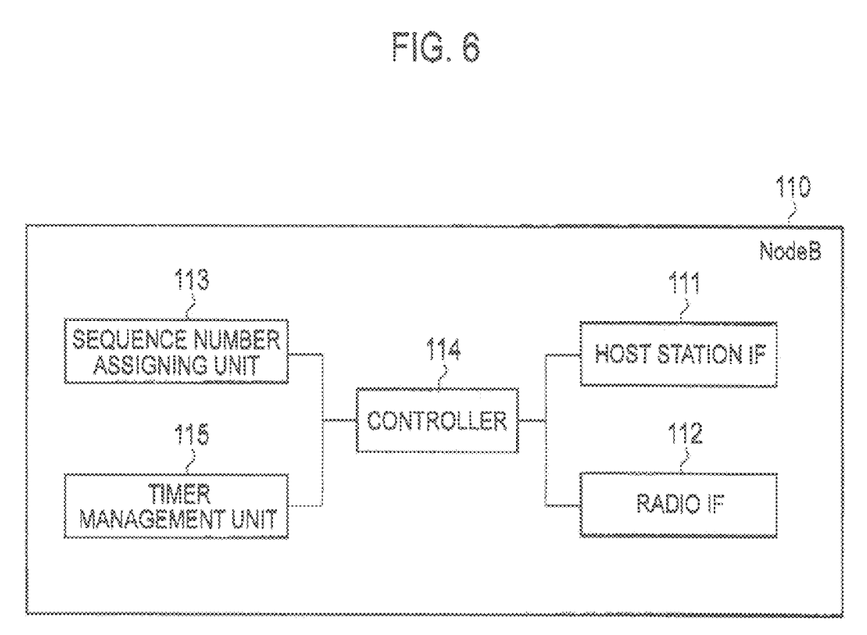
FIG. 6 is a block diagram showing an NB 110 according to Modification 1.

Hereinafter, a radio base station according to Modification 1 is described with reference to the accompanying drawings. FIG. 6 is a block diagram showing the NB 110 according to Modification 1. In FIG. 6, similar reference numerals are assigned to components similar as those shown in FIG. 3. Further, the description of the components similar as those shown in FIG. 3 is omitted.

As shown in FIG. 6, the NB 110 includes a timer management unit 115 in addition to the configuration shown in FIG. 3.

The timer management unit 115 manages various timers. For example, the timer management unit 115 manages a signal transmission suppression timer to suppress transmission of the transmission rate reduction signal.

The controller 114 described above activates the signal transmission suppression timer when a new NB 110 is added as an NB 110 with which the UE 10 is to communicate. The controller 114 suspends the transmission of the transmission rate reduction signal within a period from the time when the signal transmission suppression timer is activated until the time when the signal transmission suppression timer expires. In other words, the controller 114 suspends the transmission of transmitting the transmission rate reduction signal until the signal transmission suppression timer expires even if the congestion signal is received from the RNC 120.

Here, when the RNC 120 signals (transmits NodeB Application Part (NBAP) Message) the NB 110, the controller 114 detects that a new NB 110 is added as an NB 110 with which the UE 10 is to communicate. If the NB 110 is a radio base station already communicating with the UE 10, for example, "Radio Link Addition Request" is used as the NBAP message. Instead, if the NB 110 is a radio base station newly starting communication with the UE 10, for example, "Radio Link Setup Request" is used as the NBAP message.

In a case where the NB 110B is added as an NB 110 with which the UE 10 is to communicate in addition to the NB 110A, the NB 110 shown in FIG. 6 may be either an NB 110A or an NB 110B.

Example of Transmission Rate Reduction Signal Transmission Suppression

Figure 7:
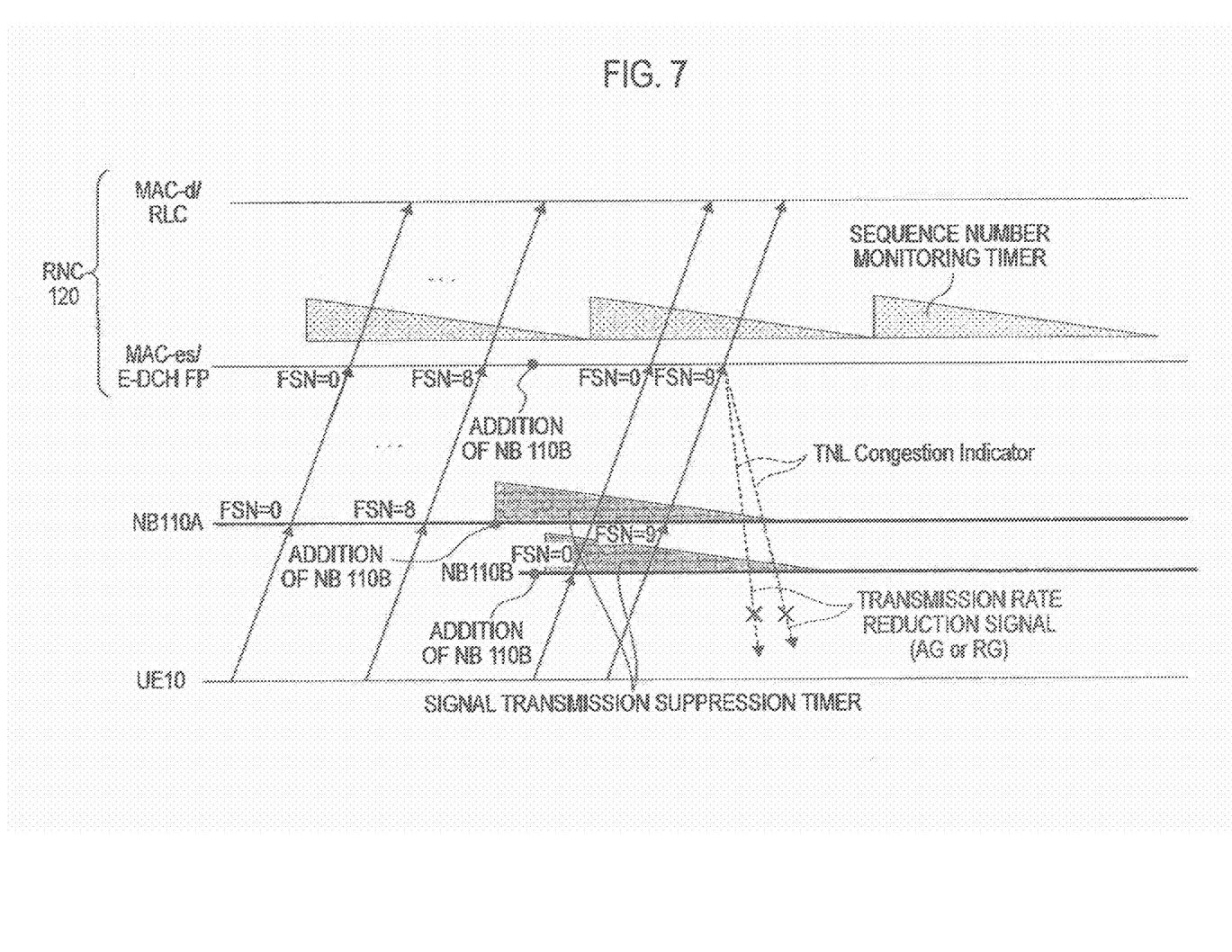
FIG. 7 is a diagram showing an example of transmission rate reduction signal transmission suppression according to Modification 1.

Hereinafter, an example of transmission rate reduction signal transmission suppression according to Modification 1 is described with reference to the accompanying drawings. FIG. 7 is a diagram showing the example of the transmission rate reduction signal transmission suppression according to Modification 1. Here, a case where the NB 110B is added as an NB 110 with which the UE 10 is to communicate in addition to the NB 110A is illustrated.

As shown in FIG. 7, the NB 110A reconfigures data received from the UE 10, and assigns a sequence number (FSN) specific to the NB 110A to a PDU corresponding to the E-DCH FP. The NB110A transmits the RNC 120 the PDU to which the FSN is assigned.

The E-DCH FP of the RNC 120 receives the PDU to which the FSN is assigned. The E-DCH FP of the RNC 120 monitors whether or not a sequence error of the FSNs occurs within the period from the time when the sequence number monitoring timer is activated until the time when the sequence number monitoring timer expires.

When the NB 110B is added as an NB 110 with which the UE 10 is to communicate in addition to the NB 110A at this time, the NB 110A activates the signal transmission suppression timer. Similarly, when the NB 110B is added as an NB 110 with which the UE 10 is to communicate in addition to the NB 110A, the NB 110B activates the signal transmission suppression timer.

The E-DCH FP of the RNC 120 detects the discontinuity between the FSN ("9" in this case) of the PDU received from the NB 110A and the FSN ("0" in this case) of the PDU received from the NB 110B. The E-DCH FP of the RNC 120 transmits the congestion signal (TNL Congestion Indicator).

Note that, the congestion signal may be transmitted only to the NB 110A, only to the NB 110B, or to both the NB 110A and the NB 110B.

For example, even when the congestion signal is received from the RNC 120, the NB 110A suspends the transmission of the transmission rate reduction signal until the signal transmission suppression timer expires. Similarly, even when the congestion signal is received from the RNC 120, the NB 110B suspends the transmission of the transmission rate reduction signal until the signal transmission suppression timer expires.

Operation and Effect

In Modification 1, in a case where a new NB 110B is added as an NB 110 with which the UE 10 is to communicate, when the new NB 110B is added, the transmission of the transmission rate reduction signal to the UE 10 is suppressed until the signal transmission suppression timer expires even if the congestion signal is received from the RNC 120. In other words, the received congestion signal which has been transmitted due to the addition of the new radio base station is neglected until the signal transmission suppression timer expires. Thus, drop in the transmission rate of the uplink user data is suppressed.

Note that, a data piece received from the previously communicating NB 110 and a data piece received from the new NB 110 are combined together by the MAC-e/es or the RLC of the RNC 120. Thus, even when the congestion signal is neglected temporarily, no problem occurs as a whole.

Modification 2

Hereinafter, Modification 2 of the first embodiment is described with reference to the accompanying drawings. Differences from the first embodiment are mainly described below.

Specifically, according to the first embodiment, the RNC 120 suspends the transmission of the congestion signal by use of the signal transmission suppression timer. Instead, according to Modification 2, a RNC 120 suspends the transmission of the congestion signal by easing signal transmission condition.

Configuration of Radio Network Controller

Figure 8:
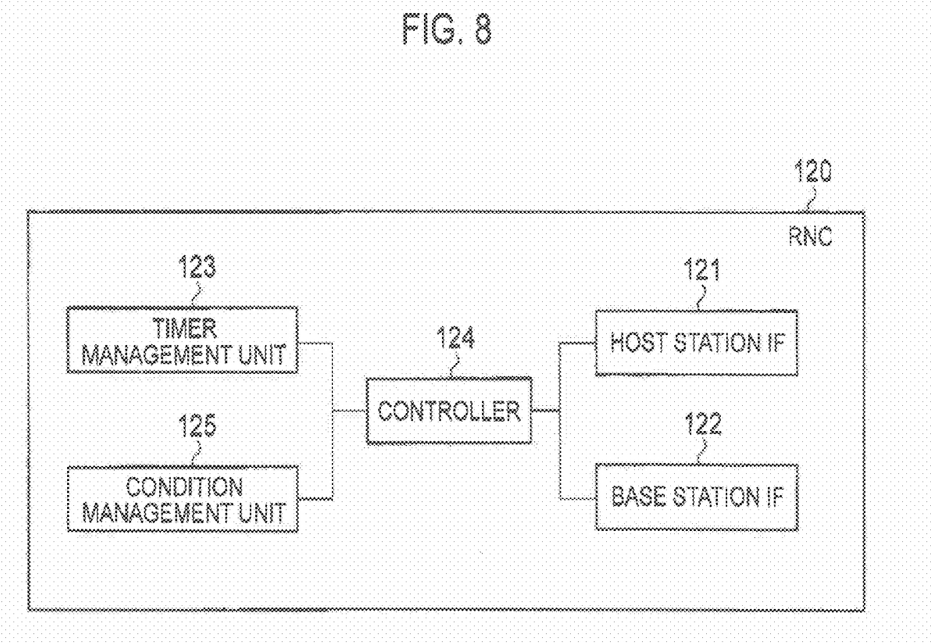
FIG. 8 is a block diagram showing an RNC 120 according to Modification 2.

Hereinafter, a radio network controller according to Modification 2 is described with reference to the accompanying drawings. FIG. 8 is a block diagram showing the RNC 120 according to Modification 2.In FIG. 8, similar reference numerals are assigned to components similar as those shown in FIG. 4. Further, the description of the components similar as those shown in FIG. 4 is omitted.

As shown in FIG. 8, the RNC 120 includes a condition management unit 125 in addition to the configuration shown in FIG. 4.

The condition management unit 125 manages the signal transmission condition for transmitting the congestion signal. The signal transmission condition is a condition for determining whether the TNL is congested or not. For example, in a case where the controller 124 transmits the congestion signal when a sequence error of the sequence numbers is detected within a period (that is, a predetermined detection period) from the time when the sequence number monitoring timer is activated until the sequence number monitoring timer expires, the signal transmission condition is the predetermined detection period set for the sequence number monitoring timer.

As an alternative, in a case where the controller 124 transmits the congestion signal when a predetermined number of sequence errors of the sequence numbers (FSNs) occur, the signal transmission condition is the predetermined number of times (threshold).

As another alternative, in a case where the controller 124 transmits the congestion signal when a predetermined number of sequence errors of the sequence numbers (FSNs) occur within the period (that is, a predetermined detection period) from the time when the sequence number monitoring timer is activated until the time when the sequence number monitoring timer expires, the signal transmission condition is the predetermined detection period set for the sequence number monitoring timer and the predetermined number of times (threshold).

Here, the condition management unit 125 eases the signal transmission condition such that the congestion signal is less likely to be transmitted when a new NB 110 is added as an NB 110 with which the UE 10 is to communicate. An example of the ease of the signal transmission condition is to shorten the predetermined detection period set for the sequence number monitoring timer. Another example of the ease of the signal transmission condition is to increase the predetermined number of times (threshold). Still another example of the ease of the signal transmission condition is to shorten the predetermined detection period set for the sequence number monitoring timer and to increase the predetermined number of times (threshold).

Example of Ease of Signal Transmission Condition

Figure 9:
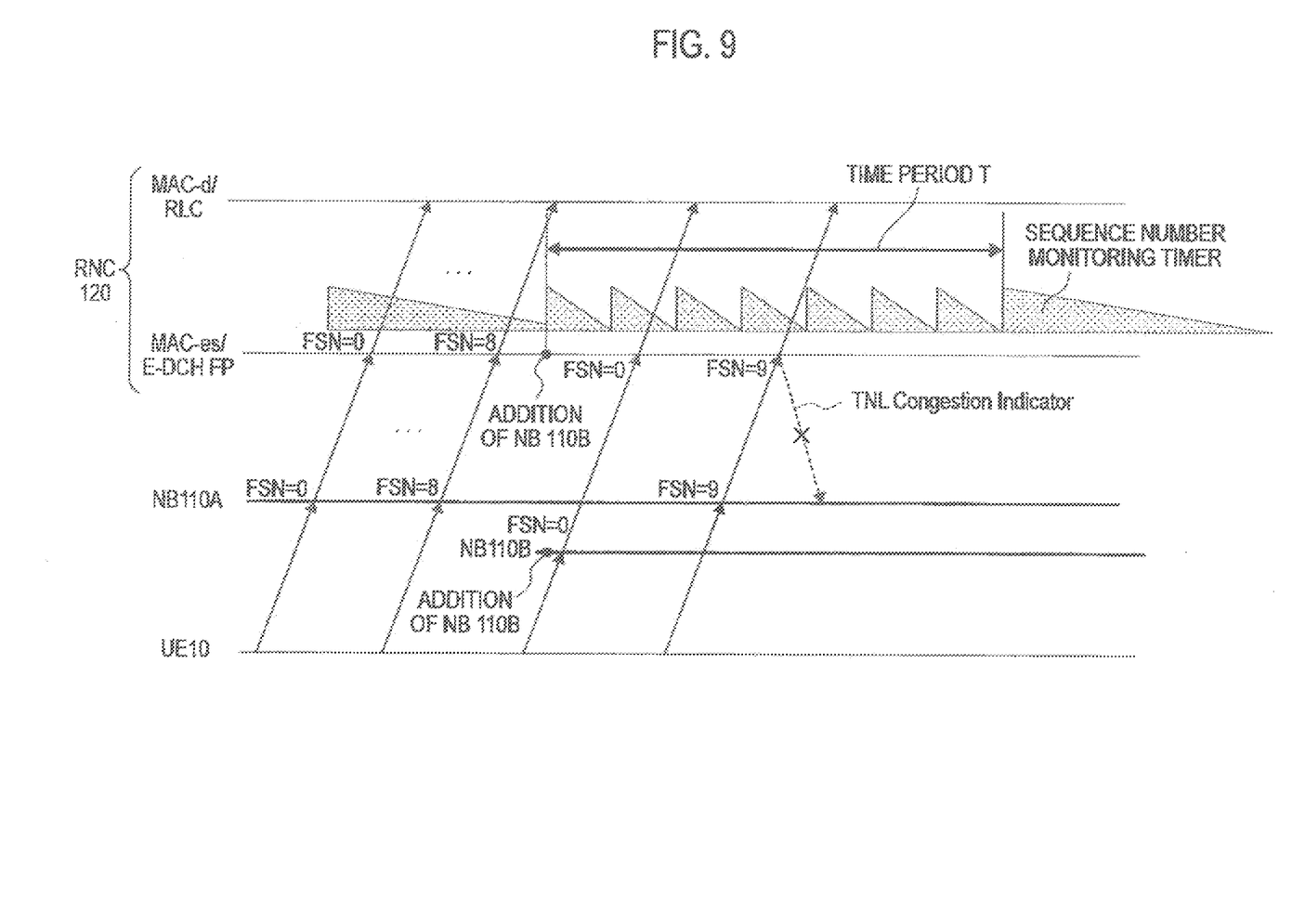
FIG. 9 is an example of ease of a signal transmission condition according to Modification 2.

Hereinafter, examples of the ease of the signal transmission condition according to Modification 2 are described with reference to the drawing. FIG. 9 is a diagram showing an example of the ease of the signal transmission condition according to Modification 2. Here, illustrated is a case where an NB 110B is added as an NB 110 with which the UE 10 is to communicate in addition to an NB 110A.

As shown in FIG. 9, the NB 110A reconfigures data received from the UE 10 and assigns a sequence number (FSN) specific to the NB 110A to a PDU corresponding to the E-DCH FP. The NB 110A transmits the RNC 120 the PDU to which the FSN is assigned.

The E-DCH FP of the RNC 120 receives the PDU to which the FSN is assigned. The E-DCH FP of the RNC 120 monitors whether a sequence error of FSNs occurs or not within the period from the time when the sequence number monitoring timer is activated until the time when the sequence number monitoring timer expires.

When the NB 110B is added as an NB 110 with which the UE is to communicate in addition to the NB 110A at this time, the E-DCH FP of the RNC 120 eases the signal transmission condition. Note that, FIG. 9 illustrates the example in which the predetermined detection period set for the sequence number monitoring timer is shortened.

Although the FSN ("9" in this case) of the PDU received from the NB 110A and the FSN ("0" in this case) of the PDU received from the NB 110B are discontinuous, such discontinuity is not detected within the predetermined detection period since the predetermined detection period has been shortened. Accordingly, the E-DCH FP of the RNC 120 transmits no congestion signal (TNL Congestion Indicator).

Note that, the E-DCH FP of the RNC 120 eases the signal transmission condition for a specific time period (T) after the NB 110B is added in addition to the NB 110A. In other words, the E-DCH FP of the RNC 120 cancels the ease of the signal transmission condition after elapse of the specific time period (T).

Operation and Effect

In Modification 2, in a case where a new NB 110 is added as an NB 110 with which the UE 10 is to communicate, the sequence error of the sequence numbers caused due to the addition of the new radio base station is less likely to be detected when the new NB 110 is added. Thus, transmission of the congestion signal is suppressed, and drop in the transmission rate of the uplink user data is suppressed.

Note that, a data piece received from the previously communicating NB 110 and a data piece received from the new NB 110 are combined together by the MAC-e/es or the RLC of the RNC 120. Thus, even when the signal transmission condition for transmitting the congestion signal is eased temporarily, no problem occurs as a whole.

The details of the present invention have been disclosed by using the embodiment described above. However, it should not be understood that the description and drawings which constitute part of this disclosure limit the present invention. From this disclosure, various alternative embodiments, examples, and operation techniques will be easily found by those skilled in the art.

What is claimed is:

1. A radio communication system comprising a radio base station and a radio network controller, wherein
    the radio base station assigns station-specific sequence numbers to uplink user data received from a radio terminal,
    the radio network controller transmits the radio base station a congestion signal indicating that a link between the radio base station and the radio network controller is congested, in response to detection of a sequence error of the sequence numbers, and
    the radio base station transmits the radio terminal a transmission rate reduction signal instructing to reduce the transmission rate of the uplink user data in response to the congestion signal,
    the radio network controller activates a signal transmission suppression timer to suppress transmission of the congestion signal, when a second radio base station is added as a radio base station with which the radio terminal is to communicate in addition to a first radio base station, and suspends the transmission of the congestion signal to the first radio base station and the second radio base station until the signal transmission suppression timer expires.

2. A radio communication system comprising a radio base station and a radio network controller, wherein
    the radio base station assigns station-specific sequence numbers to uplink user data received from a radio terminal,
    the radio network controller transmits the radio base station a congestion signal indicating that a link between the radio base station and the radio network controller is congested, in response to detection of a sequence error of the sequence numbers, and
    the radio base station transmits the radio terminal a transmission rate reduction signal instructing to reduce the transmission rate of the uplink user data in response to the congestion signal,
    the radio base stations activate a signal transmission suppression timer to suppress transmission of the transmission rate reduction signal, when a second radio base station is added as a radio base station with which the radio terminal is to communicate in addition to a first radio base station, and suspend the transmission of the transmission rate reduction signal to the radio terminal until the signal transmission suppression timer expires even when the congestion signal is received from the radio network controller.

3. A radio communication system comprising a radio base station and a radio network controller, wherein
    the radio base station assigns station-specific sequence numbers to uplink user data received from a radio terminal,
    the radio network controller transmits the radio base station a congestion signal indicating that a link between the radio base station and the radio network controller is congested, in response to detection of a sequence error of the sequence numbers, and
    the radio base station transmits the radio terminal a transmission rate reduction signal instructing to reduce the transmission rate of the uplink user data in response to the congestion signal,
    the radio network controller eases a signal transmission condition for transmitting the congestion signal such that the congestion signal is less likely to be transmitted in response to the detection of the sequence error of the sequence numbers, when a second radio base station is added as a radio base station with which the radio terminal is to communicate in addition to a first radio base station.

4. The radio communication system according to claim 3, wherein
    the radio network controller detects the sequence error of the sequence numbers for a predetermined detection period, and
    the ease of the signal transmission condition is to shorten the predetermined detection period.

5. The radio communication system according to claim 3, wherein
    the radio network controller transmits the congestion signal when a predetermined number of sequence errors of the sequence numbers occur, and
    the ease of the signal transmission condition is to increase the predetermined number.

6. A radio network controller used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal, the radio network controller comprising:
    a timer management unit configured to activate a signal transmission suppression timer to suppress transmission of the congestion signal when a second radio base station is added as a radio base station with which the radio terminal is to communicate in addition to a first radio base station; and
    a transmitter configured to suspend the transmission of the congestion signal to the first radio base station and the second radio base station until the signal transmission suppression timer expires.

7. A radio base station used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal, the radio base station comprising:

a timer management unit configured to activate a signal transmission suppression timer to suppress transmission of the transmission rate reduction signal when a second radio base station is added as a radio base station with which the radio terminal is to communicate in addition to a first radio base station; and a transmitter configured to suspend the transmission of the transmission rate reduction signal to the radio terminal until the signal transmission suppression timer expires even when the congestion signal is received from the radio network controller.

8. A radio network controller used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal, the radio network controller comprising:

a condition managing unit configured to ease a signal transmission condition for transmitting the congestion signal in response to the detection of the sequence error of the sequence numbers when a second radio base station is added as a radio base station with which the radio terminal is to communicate in addition to a first radio base station.

9. A radio communication method used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal, the method comprising the steps of:

activating, by the radio network controller, a signal transmission suppression timer to suppress transmission of the congestion signal when a second radio base station is added as a radio base station with which the radio terminal is to communicate in addition to a first radio base station; and suspending, by the radio network controller, transmission of the congestion signal to the first radio base station and the second radio base station until the signal transmission suppression timer expires.

10. A radio communication method used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal, the method comprising the steps of:

activating, by the radio base stations, a signal transmission suppression timer to suppress transmission of the transmission rate reduction signal when a second radio base station is added as a radio base station with which the radio terminal is to communicate in addition to a first radio base station; and suspending, by the radio base station, transmission of the transmission rate reduction signal to the radio terminal until the signal transmission suppression timer expires even when the congestion signal is received from the radio network controller.

11. A radio communication method used in a radio communication system including a radio base station and a radio network controller, the radio base station assigning station-specific sequence numbers to uplink user data received from a radio terminal, the radio network controller transmitting the radio base station a congestion signal indicating that a link between the radio base station and the radio network controller is congested, in response to detection of a sequence error of the sequence numbers, the radio base station transmitting the radio terminal a transmission rate reduction signal instructing to reduce the transmission rate of the uplink user data in response to the congestion signal, the method comprising the step of:

easing, by the radio network controller, a signal transmission condition for transmitting the congestion signal in response to detection of the sequence error of the sequence numbers when a second radio base station is added as a radio base station with which the radio terminal is to communicate in addition to a first radio base station.

* * * * *